UNITED STATES PATENT OFFICE.

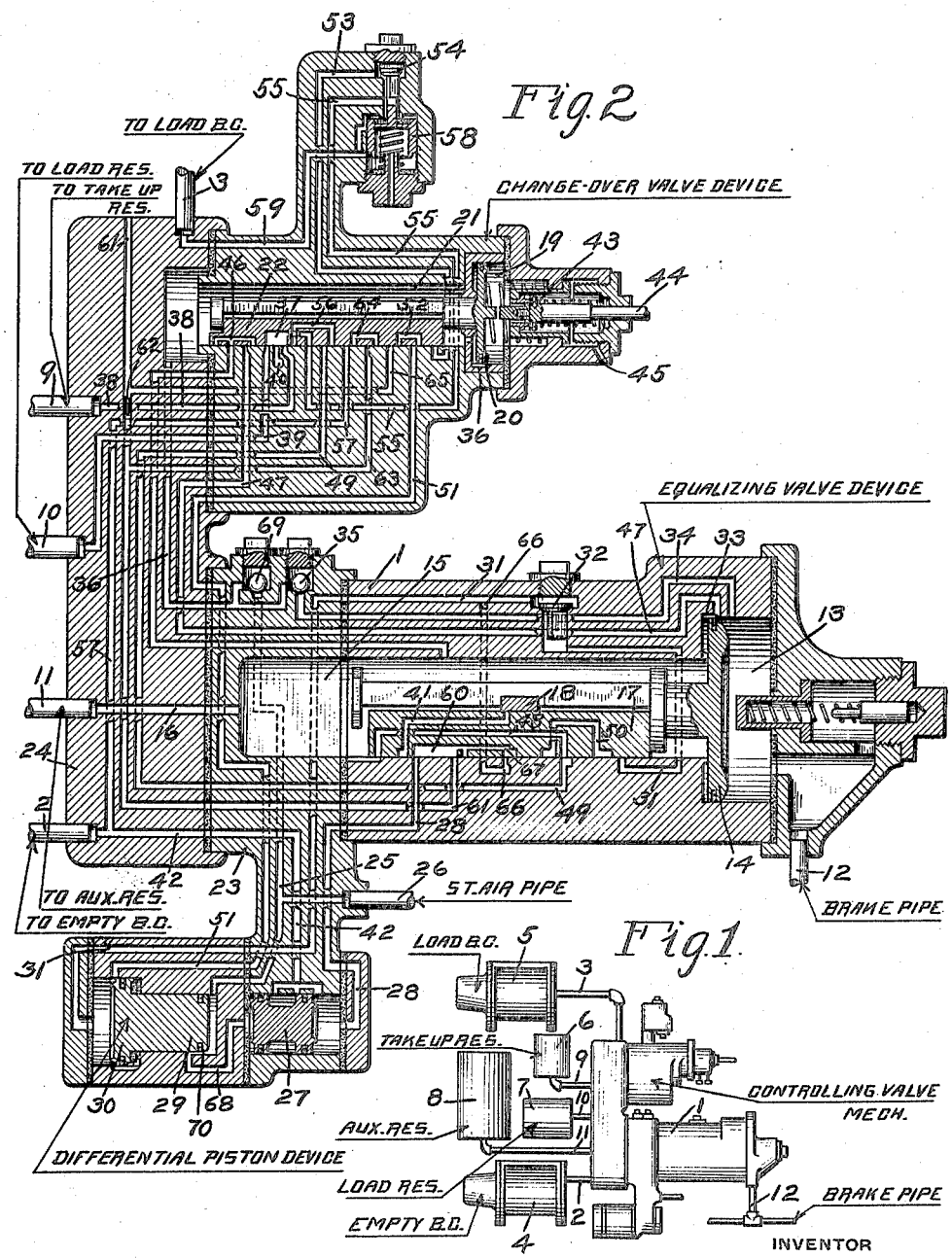

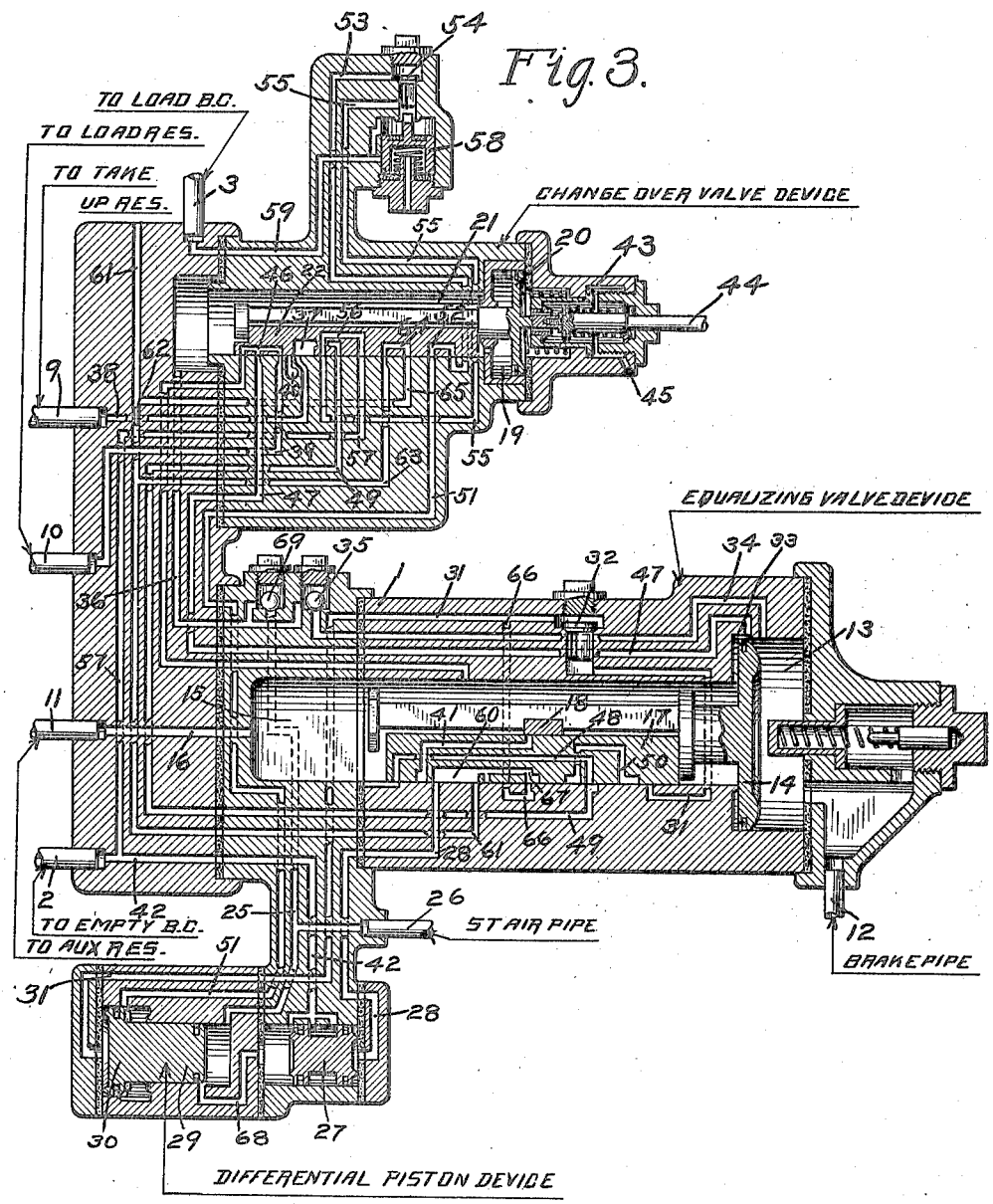

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

EMPTY AND LOAD BRAKE.

1,283,980.  Specification of Letters Patent.  Patented Nov. 5, 1918.

Application filed August 31, 1917. Serial No. 189,081.

*To all whom it may concern:*

Be it known that I, WALTER V. TURNER, a citizen of the United States, residing at Wilkinsburg, in the county of Allegheny and State of Pennsylvania, have invented new and useful Improvements in Empty and Load Brakes, of which the following is a specification.

This invention relates to fluid pressure brakes, and more particularly to a brake equipment for adjusting the braking power according as the car is empty or loaded.

It has heretofore been proposed to employ a load brake equipment in which an additional brake cylinder is provided for load braking and in order to provide for releasing fluid from both brake cylinders at the same rate as from the single brake cylinder in empty car braking, an additional release passage is provided.

In a combined automatic and straight air brake equipment, a double check valve has heretofore been employed which is adapted to be operated by fluid supplied in an automatic brake application for cutting off communication from the straight air pipe to the brake cylinder and by fluid supplied in a straight air application for cutting off communication from the equalizing valve device to the brake cylinder.

Where a combined automatic and straight air equipment is employed with an empty and load brake equipment, the usual automatic exhaust from the brake cylinder is cut off, when a straight air brake application is made, by the operation of the double check valve, but the additional release passage remains open, if the apparatus is adjusted for load braking, so that fluid can escape from the brake cylinders through this additional exhaust passage when a straight air application of the brakes is effected.

The principal object of my invention is to provide means operated upon effecting a straight air application of the brakes for cutting off the additional brake cylinder exhaust passage.

In the accompanying drawing, Figure 1 is a diagrammatic view of a combined automatic and straight air empty and load brake equipment embodying my invention; Fig. 2 a central sectional view of the controlling valve mechanism, showing the parts in normal release and empty car braking position, and Fig. 3 a similar view, showing the parts in straight air application load braking position.

The equipment may comprise a controlling valve mechanism 1 connected by pipes 2 and 3 to the empty and load brake cylinders 4 and 5 respectively, a take-up reservoir 6, load reservoir 7, and auxiliary reservoir 8, connected by the respective pipes 9, 10, and 11 to said controlling valve mechanism, and a brake pipe 12.

The controlling valve mechanism 1 may comprise an equalizing valve device having a piston chamber 13 connected to brake pipe 12 and containing piston 14 and a valve chamber 15 connected by passage 16 to auxiliary reservoir pipe 11 and containing a main slide valve 17 and an auxiliary valve 18 mounted on the main slide valve, the valves being operated by piston 14.

The controlling valve mechanism also comprises a change-over valve device having a piston chamber 19 containing piston 20 and a valve chamber 21 containing a slide valve 22 adapted to be operated by piston 20.

According to my invention, in order to control the brakes by straight air, a filling piece 23 is interposed between the equalizing valve device and the pipe bracket 24, and having a passage 25 connected to straight air pipe 26.

A double check valve 27 is mounted in said filling piece and has a passage 28 leading from one side to the seat of the slide valve.

A differential piston device is also mounted in said filling piece and comprises a small piston head 29 and a larger piston head 30.

A passage 31 leads from the larger piston head to the seat of slide valve 17, a check valve 32 being interposed in said passage.

In operation, when the brake pipe 12 is charged with fluid under pressure, fluid flows to piston chamber 13 of the equalizing valve device and thence through feed groove 33 around piston 14 to valve chamber 15, charging the auxiliary reservoir 8. Fluid also flows from piston chamber 13 through passage 34 past check valve 35 to valve chamber 21 and equalizes from valve chamber 21 through feed groove 36 to piston chamber 19.

If the change-over valve device is in empty car position, as shown in Fig. 2 of the drawings, then a cavity 37 in slide valve 22 connects passages 38 and 39, leading respectively to the take-up and load reservoir pipes 9 and 10, to an exhaust port 40.

When an automatic application of the brakes is made, with the change-over valve device set to empty position, the triple valve piston 14 moves the slide valves 17 and 18 so that passage 28 registers with port 41 and fluid is supplied from valve chamber 15 and the auxiliary reservoir to the automatic side of double check valve 27, shifting same to the position shown in Fig. 2, if not in that position. Fluid then flows from passage 28 to passage 42 which leads to empty brake cylinder pipe 2.

In order to set the apparatus for load braking, a valve 43 is unseated by the manual operation of a rod 44, so as to vent fluid from piston chamber 19 to an exhaust port 45. The fluid pressure in valve chamber 21 then causes the piston 20 to shift the valve 22 to load position, as shown in Fig. 3 of the drawing.

In this position, the load reservoir 7 is connected through passage 39 and cavity 46 with a passage 47, leading to piston chamber 13 when the piston 14 is in release position, so that said reservoir is charged with fluid under pressure from the brake pipe.

The take-up reservoir 6 is also charged with fluid under pressure from valve chamber 15 through cavity 48 in slide valve 17, passage 49, cavity 37 in slide valve 22, and passage 38.

When an automatic application of the brakes is made with the change-over valve set to load position, fluid is supplied from the auxiliary reservoir to the empty brake cylinder as in empty position and in addition, fluid from the take-up reservoir 6 is supplied to differential piston head 30 through passage 38, cavity 37, passage 49, cavity 50 in slide valve 17, and passage 31. The differential piston is then shifted to the right, opening a passage 51, the piston head 30 being adapted to seat, so as to prevent leakage from the automatic supply around the differential piston to the straight air passage 25.

From passage 51 fluid flows to the empty brake cylinder 4 through cavity 52 in change-over valve 22, passage 53, past a check valve 54, which is now open, to a passage 55, thence through a cavity 56 in slide valve 22 to passage 57 which leads to empty brake cylinder passage 42.

When the pressure in the empty brake cylinder 4 has been built up to a predetermined degree, say twenty-four pounds, this pressure will actuate a piston 58 and open communication from the empty brake cylinder passage 55 to a passage 59 which leads to the load brake cylinder pipe 3, thus permitting the pressure in the empty brake cylinder to equalize into the load brake cylinder 5.

The movement of piston 58 permits the check valve 54 to close, so that the take-up reservoir 6 is now cut off from the brake cylinders.

In releasing the brakes, when the equalizing valve device is shifted to release position, fluid is exhausted from the brake cylinders through passage 42 past double check valve 27 to passage 28 and thence through cavity 60 in slide valve 17 to exhaust passage 61 containing a choke 62. Fluid also escapes in the load position through a by-pass passage 63, which is connected through cavity 64 in change-over valve 22 with a passage 65 leading to passage 61.

An additional exhaust is also provided through passage 31, passage 66 and an extended cavity 67 leading to cavity 60.

When a straight air application of the brakes is effected with the apparatus adjusted for load braking, fluid flows from the straight air pipe 26 to passage 25 and acts on the piston head 29 to shift the differential piston so as to open a passage 68 leading to the straight air side of double check valve 27. The double check valve is then shifted to the right, opening passage 42 to the straight air side of the double check valve, so that fluid can flow through passage 42 to the empty brake cylinder pipe 2 and also through passage 57 and cavity 56 in change-over valve 22 to passage 55.

When the empty brake cylinder pressure is increased to the predetermined degree hereinbefore referred to, the piston 58 is operated to open communication from the empty brake cylinder to the load brake cylinder through passage 59.

It will now be noted that the movement of the differential piston cuts off communication from passage 31 to passage 51, so that fluid is prevented from escaping through the additional exhaust port 31 when a straight air application of the brakes is made.

When a straight air application of the brakes is made, fluid also flows through passage 25 past a check valve 69 to passage 36 leading to change-over valve chamber 21. This is for the purpose of insuring that if any higher pressure is delivered to the straight air pipe than exists in the valve chamber 21, this higher pressure in the passages controlled by the change-over valve will not lift the valve from its seat and thus permit a possible escape of fluid.

The check valve 69 prevents back flow of fluid from the change-over valve chamber 21 to the straight air pipe 26 when the brakes are controlled automatically.

Check valve 35 prevents back flow from the straight air pipe to passage 34 and the brake pipe when a straight air application of the brakes is made.

This check valve is particularly necessary when an automatic application of the brakes has been made and the equalizing piston is in application position, in which passage 34 is connected to valve chamber 15. If under this condition, a straight air application of the brakes is made and the straight air pressure exceeds the standard maximum brake pipe pressure, the auxiliary reservoir would be charged to this higher straight air pressure, so that it would be impossible to release the brakes, since the brake pipe pressure could not be increased to a sufficient degree to overcome the higher pressure in valve chamber 15 and consequently the piston 14 could not be shifted to release position.

If after a straight air application of the brakes, the brakes are released through the straight air pipe and for any reason, the differential piston should be in position cutting off communication between the passages 68 and 25, fluid can still escape through a groove 70 around the piston head 29.

By reason of the fact that straight air cannot flow to the brake cylinder without first operating the differential piston device, the closing of the additional exhaust port in straight air applications is always assured.

Having now described my invention, what I claim as new and desire to secure by Letters Patent, is:—

1. In a combined automatic and straight air brake, the combination with automatic means for effecting an application of the brakes and for controlling an additional exhaust outlet, of means operated upon effecting a straight air application of the brakes for cutting off said additional exhaust outlet.

2. In a combined automatic and straight air brake, the combination with automatic means for controlling the application and release of the brakes and controlling an additional communication through which fluid is supplied and released, of means operated upon effecting a straight air application of the brakes for closing said additional communication to prevent the release of the brakes.

3. In a combined automatic and straight air brake, the combination with a straight air pipe and an automatic valve device for controlling the application and release of the brakes, of a double check valve for controlling communication from said automatic valve device and from the straight air pipe to apply and release the brakes and means operated upon effecting a straight air application of the brakes for cutting off an additional outlet through which the brakes are released.

4. In a combined automatic and straight air brake, the combination with a straight air pipe and an automatic valve device for controlling the application and release of the brakes, of a double check valve for controlling communication from said automatic valve device and from the straight air pipe to apply and release the brakes and means controlling communication from the straight air pipe to said double check valve and operated by flow of straight air for opening said communication and for closing an additional exhaust outlet through which the brakes may be released.

5. In a combined automatic and straight air brake, the combination with a straight air pipe and an automatic valve device for controlling the application and release of the brakes, of a double check valve for controlling communication from said automatic valve device and from the straight air pipe to apply and release the brakes and means operated by flow of fluid from the automatic valve device for opening a communication through which fluid is supplied to apply the brakes and for closing communication from the straight air pipe to said double check valve.

6. In a combined automatic and straight air brake, the combination with a straight air pipe and an automatic valve device for controlling the application and release of the brakes, of a double check valve for controlling communication from said automatic valve device and from the straight air pipe to apply and release the brakes and a differential piston device subject on the larger piston head to flow of fluid from the automatic valve device and on the smaller head to the flow of fluid from the straight air pipe for controlling communication from the straight air pipe to said double check valve and communication through which the automatic valve device supplies fluid to apply the brakes.

7. In a combined automatic and straight air empty and load brake equipment, the combination with means for adjusting the equipment for loaded and empty car braking, an automatic valve device for controlling the application and release of the brakes, and a straight air pipe, of a double check valve for controlling communication from the automatic valve device and from the straight air pipe to apply and release the brakes and means operated by an additional flow of fluid from the automatic valve device when the equipment is adjusted for load braking for opening communication through which said additional flow is supplied to apply the brakes and for closing communication from the straight air pipe to said double check valve.

8. In a combined automatic and straight air empty and load brake equipment, the combination with means for adjusting the equipment for loaded and empty car braking, an automatic valve device for controlling the application and release of the brakes, and a straight air pipe, of a double check valve for controlling communication from the automatic valve device and from the straight air pipe to apply and release the brakes and means operated by straight air for opening communication from the straight air pipe to said double check valve and for closing an additional exhaust port through which the brakes may be released.

In testimony whereof I have hereunto set my hand.

WALTER V. TURNER.